3,459,778
8,14-SECOGONA-1,3,5(10),6,8-PENTAEN-14-ONES
Gordon Alan Hughes, Haverford, and Herchel Smith, Wayne, Pa., assignors to American Home Products Corporation, New York, N.Y., a corporation of Delaware
No Drawing. Continuation-in-part of application Ser. No. 540,857, Apr. 7, 1966. This application Apr. 12, 1967, Ser. No. 630,210
Int. Cl. C07c 171/07, 167/02
U.S. Cl. 260—397.45                 10 Claims

ABSTRACT OF THE DISCLOSURE

This invention is concerned with 8,14-secogona-1,3,5(10),6,8-pentaen-14-ones which are useful intermediates in the preparation of known gonapentaenes which possess estrogenic activity. Further, this invention is concerned with the process of preparing these compounds by the dehydrogenation of appropriate 8,14-secogona-1,3,5(10,9-tetraen-14-ones and their subsequent cyclization to afford the corresponding gona-1,3,5(10)6,8,14-hexaenes.

---

This application is a continuation-in-part of U.S. patent application Ser. No. 540,857, filed on Apr. 7, 1966, and now abandoned.

This invention relates to new and novel 8,14-secogonapentaenes as well as to the novel process of preparing and utilizing these compounds as precursors in the synthesis of therapeutically efficacious steroid compounds. In particular, the present invention is concerned with the preparation of 8,14-secogona-1,3,5(10),6,8 - pentaen - 14 - ones which are useful as intermediates.

The novel compounds which are included within the scope of the present invention are represented by the following formula:

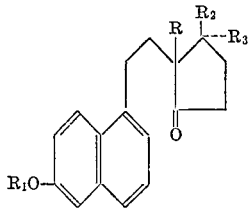

wherein R is lower alkyl and $R_1$ is selected from the group consisting of hydrogen, lower alkyl and lower alkanoyl; $R_2$ is selected from the group consisting of hydrogen, hydroxy, lower alkanoyloxy, benzoyloxy, halobenzoyloxy, lower alkylbenzoyloxy, and phen(lower)alkanoyloxy; $R_3$ is selected from the group consisting of hydrogen, lower alkanoyloxy, benzoyloxy, halobenzoyloxy, lower alkylbenzoyloxy and phen(lower)alkanoyloxy with the proviso that at least one of $R_2$ and $R_3$ is hydrogen; and $R_2$ and $R_3$ when taken together are oxo. Typical examples of these compounds include: 3-methoxy-13β-methyl-8,14-secogona-1,3,5(10),6,8-pentaen-14,17 - dione; 3-hydroxy-13β-methyl-8,14-secogona-1,3,5(10),6,8 - pentaen-14,17-dione; 3-acetoxy-13β-8,14-secogona-1,3,5(10),6,8-pentaen-14,17-dione; 3-methoxy-13β-methylgona-1,3-5(10),6,8,14-hexaen-17β-ol and 3-methoxy-13β - methyl-17α-acetoxygona-1,3,5(10),6,8-pentaene.

The new and novel process of the present invention comprises the preparation of the compounds of the present invention and their utilization in the synthesis of gona-1,3,5(10),6,8,14-hexaenes which are used as intermediates in the preparation of gona-1,3,5(10),6,8-pentaenes which possess utility as estrogenic agents.

The following schematic sequence of reaction illustrates this novel process

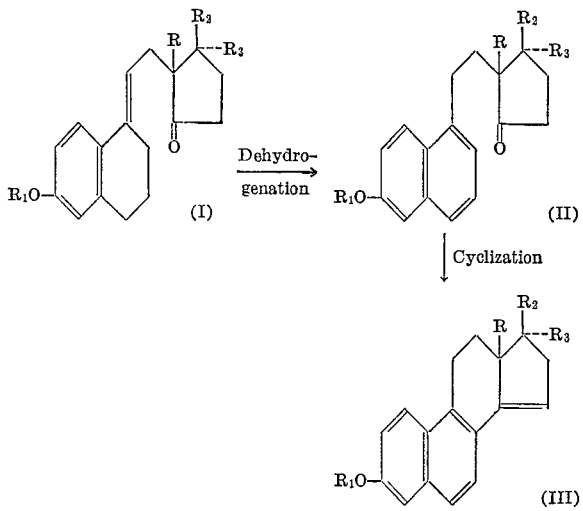

wherein R and $R_1$ are defined as above. The dehydrogenation reaction is effected by heating an appropriate 8,14-secogona-1,3,5(10),9-tetraen-14-one (I) in a reaction-inert solvent, in the presence of an oxidizing catalyst, at a temperature range from about 70° C. to about 160° C. for a period of from about two to about eight hours. Preferably, this reaction is conducted in toluene, in the presence of palladized charcoal, at about reflux temperatures for about eight hours. After the dehydrogenation reaction is complete, the resulting novel 8,14-secogona-1,3,5(10),6,8-pentaen-14-one (II) is obtained by conventional methods, such as, filtration and concentration of the filtrate.

Cyclization of a 8,14-secogona-1,3,5(10),6,8-pentaen-14-one (II) may be effected by heating said compound, in a reaction-inert solvent, in the presence of excess polyphosphoric acid, at a temperature range from about 50° C. to about 100° C. for from about ten minutes to about three hours. Preferably, this reaction is conducted in benzene, in the presence of polyphosphoric acid, at about 70° C. for about fifteen minutes. When the cyclization reaction is complete, the gona-1,3,5(10),6,8,14-hexaene (III) product may be separated by standard recovery procedures, e.g. aqueous dilution, extraction with a water immiscible solvent, concentration of the extract and recrystallization from a suitable solvent, such as an alkanol.

The gona-1,3,5(10),6,8,14-hexaenes (III) made by the process of this invention may be further reacted by the hydrogenation procedure of Johnson et al., J.A.C.S. 69, 2942 (1947), to produce the corresponding prior art gona-1,3,5(10),6,8-pentaen-17-ones which are useful as estrogenic agents.

The 8,14 - secogona - 1,3,5(10),9 - tetraen - 14 - one starting materials utilized in the synthesis of the compounds and process of the present invention may be prepared by the processes described by Smith et al. in J.C.S. p. 4472–4492 (1964), and Gibian et al. in Tetrahedron Letters No. 21, p. 2321 (1966). By reaction-inert solvent as employed herein is meant a solvent which dissolves the reactants and does not prevent their interaction, such as, benzene, xylene, toluene and p-isopropyl toluene. The term "oxidizing catalyst" as employed above includes, among others, palladized charcoal, metallic platinum black, metallic selenium and powdered sulfur. When metallic selenium and powdered sulfur are employed as catalyst, the reaction is conducted in the absence of a reaction-inert solvent. Further, reactions catalyzed by metallic selenium are conducted at temperatures of about 300° C., while sulfur catalyzed dehydrogenations are performed at temperatures of about 200° C.

It will be apparent from the disclosure herein to those skilled in the art that for the purpose of this invention, certain atoms of the benzenoid portion of the starting compounds could be otherwise substituted or be substituted with groups which do not interfere with the subsequent reactions. Thus, at the 1, 2 or 4 positions, an alkyl (e.g., methyl and propyl), an alkoxy (e.g., methoxy and butoxy), or a halogen (e.g., chloro and bromo) groups could be present in lieu of hydrogen. When the starting compounds are substituted as hereinbefore recited, it will be apparent to those skilled in the art of chemistry that the compound of this invention and those prior art compounds prepared by the process of this invention will bear correspondingly the same substituents. Thus for the process of this invention and for the products of the invention produced thereby, such groups are the full equivalents of the claimed invention.

The following examples are given by way of illustration and are not to be construed as limitations of this invention, many variations of which are possible without departing from the scope and spirit thereof.

EXAMPLE I

3 - methoxy - 13β - methyl - 8,14 - secogona - 1,3,5 (10),9-tetraen-14,17-dione (2.0 g.) is refluxed with 10% palladized charcoal (2.0 g.) in toluene (35 cc.) for eight hours. Thereafter, the catalyst is removed by filtration and the solvent evaporated to yield a residue (1.95 g.) of 3 - methoxy - 13β - methyl - 8,14 - secogona - 1,3,5 (10),6,8-pentaen-14,17-dione.

The above prepared 3-methoxy-13β-methyl-8,14-secogona - 1,3,5(10),6,8 - pentaen - 14,17 - dione (0.6 g.) is dissolved in benzene (10 cc.) and stirred with polyphosphoric acid (10 cc.) at 70° C. for fifteen minutes. Thereafter, the reaction mixture is diluted with water and extracted with ether. The ether extract is then washed, dried, and evaporated. The residue is recrystallized from methanol to give 3-methoxy-13β-methylgona-1,3,5(10),6,8,14-hexaen-17-one (0.28 g.), M.P. 151–157° C., raised to 160–161° C. by filtration through Florex and recrystallization from acetomethanol.

EXAMPLE II

3 - hydroxy - 13β - methyl - 8,14 - secogona - 1,3,5(10), 9-tetraen-14,17-dione (1.0 g.) is heated to 160° C. with 5% palladized charcoal (2.0 g.) in p-isopropyl-toluene (17 cc.) for two hours. Thereafter, the catalyst is removed by filtration and the solvent evaporated to yield a residue of 3-hydroxy-13β-methyl-8,14-secogona-1,3,5 (10),6,8-pentaen-14,17-dione.

The above prepared 3-hydroxy-13β-methyl-8,14-secogona - 1,3,5(10),6,8 - pentaen - 14,17 - dione (0.5 g.) is dissolved in benzene (10 cc.) and stirred with polyphosphoric acid (10 cc.) at 50° C. for three hours. Thereafter, the reaction mixture is diluted with water and extracted with chloroform. The chloroform extract is then washed, dried, and evaporated. The residue is recrystallized from ethanol to give 3-hydroxy-13β-methylgona-1,3,5(10),6,8, 14-hexaen-17-one.

In the same manner, 3-methoxy-13β-propyl-8,14-secogona-1,3,5(10),9-tetraen-14,17-dione is dehydrogenated to give 3 - methoxy - 13β - propyl - 8,14 - secogona - 1,3,5 (10),6,8-pentaen-14,17-dione which is then cyclized to 3-methoxy - 13β - propylgona - 1,3,5(10),6,8,14 - hexaen-17-one.

EXAMPLE III

3 - ethoxy - 13β - ethyl - 8,14 - secogona - 1,3,5(10),9-tetraen-14,17-dione (4.0 g.) is refluxed with 30% palladized charcoal (1.5 g.) in benzene (70 cc.) for six hours. Thereafter, the catalyst is removed by filtration and the solvent evaporated to yield a residue of 3-ethoxy-13β-ethyl - 8,14 - secogona - 1,3,5(10),6,8 - pentaen - 14,17-dione.

The above prepared 3-ethoxy-13β-ethyl-8,14-secogona-1,3,5(10),6,8-pentaen-14,17-dione (1.0 g.) is dissolved in xylene (20 cc.) and stirred with polyphosphoric acid (20 cc.) at 100° C. for ten minutes. Thereafter, the reaction mixture is diluted with water and extracted with ethyl acetate. The ethyl acetate extract is then washed, dried, and evaporated. The residue is recrystallized from butanol to yield 3-ethoxy-13β-ethylgona-1,3,5(10),6,8,14-hexaen-17-one.

Similarly, 3 - butoxy - 13β - methyl - 8,14 - secogona-1,3,5(10),9-tetraen - 14,17 - dione is oxidized to form 3-butoxy-13β-methyl-8,14-secogona-1,3,5(10),6,8 - pentaen-14,17-dione which is then cyclized to form 3-butoxy-13β-methyl-gona-1,3,5(10),6,8,14-hexaen-17-one.

EXAMPLE IV 3-acetoxy-13β-methyl - 8,14 - secogona - 1,3,5(10),9-tetraen-14,17-dione (2.0 g.) is refluxed with 20% palladized charcoal (1.0 g.) in toluene (35 cc.) for eight hours. Thereafter, the catalyst is removed by filtration and the solvent evaporated to yield a residue of 3-acetoxy-13β-methyl-8,14-secogona-1,3,5(10),6,8-pentaen-14,17-dione.

The above prepared 3-acetoxy-13β-methyl-8,14-secogona-1,3,5(10),6,8-pentaen-14,17-dione (0.5 g.) is dissolved in benzene (10 cc.) and stirred with polyphosphoric acid (10 cc.) at 70° C. for twenty minutes. Thereafter, the reaction mixture is diluted with water and extracted with ether. The ethereal extract is then washed, dried, and evaporated. The residue is recrystallized from methanol to give 3 - acetoxy - 13β - methylgona - 1,3,5(10),6,8,14-hexaen-17-one.

In the same manner, the above reaction is repeated, utilizing 0.2 g. of metallic platinum black, to obtain the same product.

EXAMPLE V

13β-ethyl-3-propionyloxy - 8,14 - secogona-1,3,5(10),9-tetraen-14,17-dione (0.5 g.) is heated to 70° C. with 15% palladized charcoal (0.5 g.) in p-isopropyl-toluene (4.0 cc.) for four hours. Thereafter, the catalyst is removed by filtration and the solvent evaporated to yield a residue of 13β-ethyl-3-propionyloxy-8,14-secogona-1,3,5(10),6,8-pentaen-14,17-dione.

The above prepared 13β-ethyl - 3 - propionyloxy-8,14-secogona-1,3,5(10),6,8-pentaen - 14,17 - dione (0.5 g.) is dissolved in xylene (1.5 cc.) and stirred with polyphosphoric acid (1.0 cc.) at 120° C. for one hour. Thereafter, the reaction mixture is diluted with water and extracted with chloroform. The chloroform extract is then washed, dried, and evaporated. The residue is recrystallized from isopropanol to give 13β - ethyl - 3 - propionyloxygona-1,3,5(10),6,8,14-hexaen-17-one.

In the same manner, 3-butyryloxy - 13β - methyl-8,14-secogona-1,3,5(10),9-tetraen - 14,17 - dione is contacted with palladized charcoal to form 3-butyryloxy-13β-methyl-8,14-secogona-1,3,5(10),6,8-pentaen-14,17-dione which is cyclized by reaction with polyphosphoric acid to yield 3-butyryloxy-13β-methylgona - 1,3,5(10),6,8,14 - hexaen-17-one.

EXAMPLE VI

3 - methoxy-13β-methyl-8,14-seco - 17β - hydroxygona-1,3,5(10),9(11)-tetraen-14-one (1.0 g.) is refluxed with 10% palladium on charcoal (1.0 g.) in toluene (20 cc.) for eight hours. The catalyst is removed by filtration and the solvent evaporated to give 17β-hydroxy-3-methoxy-13β-methyl-8,14-secogona - 1,3,5(10),6,8 - pentaen - 14-one.

The above prepared 17β-hydroxy-3-methoxy-13β-methyl-8,14-secogona - 1,3,5(10),6,8-pentaen-14-one (0.5 g.) in benzene (10 cc.) is stirred with polyphosphoric acid (10 cc.) at 70° C. for fifteen minutes. The cooled reaction mixture is diluted with water and extracted with ether. The ethereal solution is washed, dried and evaporated and the residue chromatographed on neutral alumina (20 g.) to afford 3-methoxy-13β-methylgona - 1,3,5(10),6,8,14-hexaen-17β-ol.

In the same way 17β-acetoxy-3-methoxy-13β-methyl-8,14-secogona-1,3,5(10),9(11)-tetraen-14-one is dehydrogenated with 10% palladium on charcoal and the resulting 17β-acetoxy-3-methoxy-13β-methyl - 8,14 - secogona-1,3,5(10),6,8-hexaene cyclized with polyphosphoric acid to afford 17β - acetoxy-3-methoxy - 13β - methylgona-1,3,5(10),6,8,14-hexaene.

EXAMPLE VII

17α - acetoxy-3-methoxy - 13β - methyl-8,14-secogona-1,3,5(10),9(11) - tetraen-14-one is dehydrogenated with palladium on charcoal and the resulting 17α-acetoxy-3-methoxy-13β-methyl - 8,14 - secogona - 1,3,5(10),6,8-pentaen-14-one is cyclized as described in Example VI to afford 17α-acetoxy - 3 - methoxy - 13β - methylgona-1,3,5(10),6,8,14-hexaene.

EXAMPLE VIII

Repeating the procedure of the prior examples, the hereinafter listed 8,14 - secogona-1,3,5(10),9-tetraen-14-ones are dehydrogenated to afford the following 8,14-secogona-1,3,5(10),6,8-pentaen-14-ones which are then cyclized to yield the following gona - 1,3,5(10),6,8,14-hexaenes:

EXAMPLE X

3 - methoxy - 13β - methyl-17α-phenacetoxy-8,14-secogona-1,3,5(10),9(11)-tetraen-14-one (2.0 g.) is refluxed with 10% palladium on charcoal (2.0 g.) in toluene (40 cc.) for ten hours. The catalyst is removed by filtration and the solvent evaporated to give 3-methoxy-13β-methyl-17α - phenacetoxy - 8,14-secogona-1,3,5(10),6,8-pentaen-14-one.

The 3-methoxy-13β-methyl-17α-phenacetoxy-8,14-secogona-1,3,5(10),6,8-pentaen-14-one (1.0 g.) in benzene (20 cc.) is stirred with polyphosphoric acid (20 cc.) at 70° C. for thirty minutes. The cooled reaction mixture is diluted with water and extracted with ether. The ethereal solution is washed, dried and evaporated and the residue chromatographed on neutral alumina (40 g.) to give 3-methoxy - 13β-methyl-17α-phenacetoxygona-1,3,5(10),6,8,14-hexaene.

In the same way 3-methoxy-13β-methyl-17α-phenpropionyloxy - 8,14-secogona-1,3,5(10),9(11)-tetraen-14-one is dehydrogenated with 10% palladium on charcoal and the resulting 3-methoxy-3β-methyl-17α-phenpropionyloxy-secogona-1,3,5(10),6,8-pentaen-14-one cyclized with polyphosphoric acid to afford 3 - methoxy-13β-methyl-17α-phenpropionyloxygona-1,3,5(10),6,8,14-hexaene.

| Tetraenes | Pentaenes | Hexaenes |
| --- | --- | --- |
| 17β-butyryloxy-3-methoxy-13β-methyl-8,14-secogona-1,3,5(10),9(11)-tetraen-14-one. | 17β-butyryloxy-3-methoxy-13β-methyl-8,14-secogona-1,3,5(10),6,8-pentaen-14-one. | 17β-butyryloxy-3-methoxy-13β-methylgona-1,3,5(10),6,8,14-hexaene. |
| 3-methoxy-17α-propionyloxy-13β-propyl-8,14-secogona-1,3,5(10),9(11)-tetraen-14-one. | 3-methoxy-17α-propionyloxy-13β-propyl-8,14-secogona-1,3,5(10),6,8-pentaen-14-one. | 3-methoxy-17α-propionyloxy-13β-propylgona-1,3,5(10),6,8,14-hexaene. |
| 17β-benzoyloxy-3-methoxy-13β-methyl-8,14-secogona-1,3,5(10),9(11)-tetraen-14-one. | 17β-benzoyloxy-3-methoxy-13β-methyl-8,14-secogona-1,3,5(10),6,8-pentaen-14-one. | 17β-benzoyloxy-3-methoxy-13β-methylgona-1,3,5(10),6,8,14-hexaene. |
| 17β-(p-chlorobenzoyloxy)-3-ethoxy-13β-ethyl-8,14-secogona-1,3,5(10),9(11)-tetraen-14-one. | 17β-(p-chlorobenzoyloxy)-3-ethoxy-13β-ethyl-8,14-secogona-1,3,5(10),6,8-pentaen-14-one. | 17β-(p-chlorobenzoyloxy)-3-ethoxy-13β-ethylgona-1,3,5(10),6,8,14-hexaene. |
| 17α-benzoyloxy-3-methoxy-13β-methyl-8,14-secogona-1,3,5(10),9(11)-tetraen-14-one. | 17α-benzoyloxy-3-methoxy-13β-methyl-8,14-secogona-1,3,5(10),6,8-pentaen-14-one. | 17α-benzoyloxy-3-methoxy-13β-methylgona-1,3,5(10),6,8,14-hexaene. |
| 17α-(p-chlorobenzoyloxy)-3-ethoxy-13β-ethyl-8,14-secogona-1,3,5(10),9(11)-tetraen-14-one. | 17α-(p-chlorobenzoyloxy)-3-ethoxy-13β-ethyl-8,14-secogona-1,3,5(10),6,8-pentaen-14-one. | 17α-(p-chlorobenzoyloxy)-3-ethoxy-13β-ethylgona-1,3,5(10),6,8,14-hexaene. |
| 17β-(p-bromobenzoyloxy)-3-methoxy-13β-methyl-8,14-secogona-1,3,5(10),9(11)-tetraen-14-one. | 17β-(p-bromobenzoyloxy)-3-methoxy-13β-methyl-8,14-secogona-1,3,5(10),6,8-pentaen-14-one. | 17β-(p-bromobenzoyloxy)-3-methoxy-13β-methylgona-1,3,5(10),6,8,14-hexaene. |
| 17α-(m-fluorobenzoyloxy)-3-methoxy-13β-ethyl-8,14-secogona-1,3,5(10),9(11)-tetraen-14-one. | 17α-(m-fluorobenzoyloxy)-3-methoxy-13β-ethyl-8,14-secogona-1,3,5(10),6,8-pentaen-14-one. | 17α-(m-fluorobenzoyloxy)-3-methoxy-13β-ethylgona-1,3,5(10),6,8,14-hexaene. |
| 17α-(p-ethylbenzoyloxy)-3-methoxy-13β-methyl-8,14-secogona-1,3,5(10),9(11)-tetraen-14-one. | 17α-(p-ethylbenzoyloxy)-3-methoxy-13β-methyl-8,14-secogona-1,3,5(10),6,8-pentaen-14-one. | 17α-(p-ethylbenzoyloxy)-3-methoxy-13β-methylgona-1,3,5(10),6,8,14-hexaene. |
| 17β-(p-toloyloxy)-3-methoxy-13β-methyl-8,14-secogona-1,3,5(10),9(11)-tetraen-14-one. | 17β-(p-toloyloxy)-3-methoxy-13β-methyl-8,14-secogona-1,3,5(10),6,8-pentaen-14-one. | 17β-(p-toloyloxy)-3-methoxy-13β-methylgona-1,3,5(10),6,8,14-hexaene. |
| 17α-(p-bromobenzoyloxy)-3-methoxy-13β-methyl-8,14-secogona-1,3,5(10),9(11)-tetraen-14-one. | 17α-(p-bromobenzoyloxy)-3-methoxy-13β-methyl-8,14-secogona-1,3,5(10),6,8-pentaen-14-one. | 17α-(p-bromobenzoyloxy)-3-methoxy-13β-methylgona-1,3,5(10),6,8,14-hexaene. |
| 17α-(p-toloyloxy)-3-methoxy-13β-methyl-8,14-secogona-1,3,5(10),9(11)-tetraen-14-one. | 17α-(p-toloyloxy)-3-methoxy-13β-methyl-8,14-secogona-1,3,5(10),9(11)-tetraen-14-one. | 17α-(p-toloyloxy)-3-methoxy-13β-methylgona-1,3,5(10),6,8,14-hexaene. |

EXAMPLE IX

3 - methoxy - 13β - methyl-17β-phenacetoxy-8,14-secogona-1,3,5(10),9(11)-tetraen-14-one (2.0 g.) is refluxed with 10% palladium on charcoal (2.0 g.) in toluene (40 cc.) for ten hours. The catalyst is removed by filtration and the solvent evaporated to give 3-methoxy-13β-methyl - 17β - phenacetoxy - 8,14-secogona-1,3,5(10),6,8-penaen-14-one.

The 3-methoxy-13β-methyl-17β-phenacetoxy-8,14-secogona-1,3,5(10),6,8-pentaen-14-one (1.0 g.) in benzene (20 cc.) is stirred with polyphosphoric acid (20 cc.) at 70° C. for thirty minutes. The cooled reaction mixture is diluted with water and extracted with ether. The ethereal solution is washed, dried and evaporated and the residue chromatographed on neutral alumina (40 g.) to give 3-methoxy - 13β-methyl-17β-phenacetoxygona-1,3,5(10),6, 8,14-hexaene.

In the same way 3-methoxy-13β-methyl-17β-phenpropionyloxy - 8,14-secogona-1,3,5(10),9(11)-tetraen-14-one is dehydrogenated with 10% palladium on charcoal and the resulting 3-methoxy-13β-methyl-17β - phenpropionyloxy - 8,14-secogona-1,3,5(10),6,8-pentaen-14-one cyclized with polyphosphoric acid to afford 3-methoxy-13β-methyl-17β-phenpropionyloxygona-1,3,5(10),6,8,14-hexaene.

What is claimed is:
1. A compound selected from the group consisting of those having the formula:

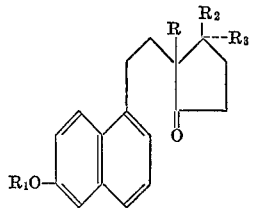

wherein R is lower alkyl and $R_1$ is selected from the group consisting of hydrogen, lower alkyl and lower alkanoyl; $R_2$ is selected from the group consisting of hydrogen, hydroxy, lower alkanoyloxy, benzoyloxy, halobenzoyloxy, lower alkylbenzoyloxy and phen(lower)alkanoyloxy; $R_3$ is selected from the group consisting of hydrogen, lower alkanoyloxy, benzoyloxy, halobenzoyloxy, lower alkylbenzoyloxy and phen(lower)alkanoyloxy with the proviso that one of $R_2$ and $R_3$ is hydrogen; and $R_2$ and $R_3$ when taken together are oxo.

2. A compound as described in claim 1 which is: 3-methoxy-13β-methyl-8,14-secogona-1,3,5(10),6,8-pentaen-14,17-dione.

3. A compound as described in claim 1 which is: 3-hydroxy-13β-methyl-8,14-secogona - 1,3,5(10),6,8 - pentaen-14,17-dione.

4. A compound as described in claim 1 which is: 3-ethoxy-13β-ethyl-8,14-secogona - 1,3,5(10),6,8 - pentaen - 14,17-dione.

5. A compound as described in claim 1 which is: 3-butoxy-13β-methyl-8,14-secogona - 1,3,5(10),6,8 - pentaen-14,17-dione.

6. A compound as described in claim 1 which is: 3-acetoxy-13β-methyl-8,14-secogona - 1,3,5(10),9 - tetraen-14,17-dione.

7. A compound as described in claim 1 which is: 13β-ethyl-3-propionyloxy-8,14-secogona - 1,3,5(10),9 - tetraen-14,17-dione.

8. A process for the production of a gona-1,3,5(10),6,8,14-hexane which comprises:
 (a) dehydrogenating a 8,14 - secogona - 1,3,5(10),9-tetraen-14-one by heating said compound in the presence of an oxidizing catalyst selected from the group consisting of palladized charcoal, metallic platinum black, metallic selenium and powdered sulfur, to form a 8,14-secogona-1,3,5(10),6,8-pentaen-14-one; and
 (b) cyclizing said 8,14-secogona-1,3,5(10),6,8-pentaen-14-one by contact with polyphosphoric acid in a reaction-inert solvent at a temperature that is in the range of from about 50° C. to about 100° C. for a period of from about ten minutes to about three hours.

9. A process for the production of a compound having the formula:

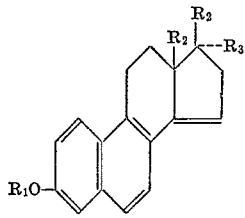

wherein R is lower alkyl and $R_1$ is selected from the group consisting of hydrogen, lower alkyl and lower alkanoyl; $R_2$ is selected from the group consisting of hydrogen, hydroxy, lower alkanoyloxy, benzoyloxy, halobenzoyloxy, lower alkylbenzoyloxy and phen(lower)alkanoyloxy; $R_3$ is selected from the group consisting of hydrogen, lower alkanoyloxy, benzoyloxy, halobenzoyloxy, lower alkylbenzoyloxy, and phen(lower)alkanoyloxy with the proviso that one of $R_2$ and $R_3$ is hydrogen; and $R_2$ and $R_3$ when taken together are oxo which comprises:

(a) contacting 8,14-secogona-1,3,5(10,9-tetraen-14-one of the formula:

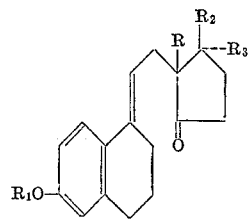

wherein R, $R_1$, $R_2$ and $R_3$ are defined as above, with an oxidizing catalyst selected from the group consisting of palladized charcoal and metallic platinum black, in a reaction-inert solvent at a temperature that is in the range of from about 70° C. to about 160° C. for a period of from about two hours to about eight hours, to form a 8,14-secogona-1,3,5(10),6,8-pentaen-14-one of the formula:

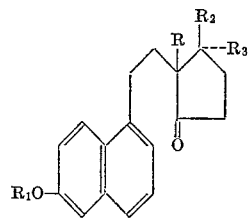

wherein R, $R_1$, $R_2$ and $R_3$ are defined as above; and
(b) cyclizing said 8,14-secogona-1,3,5(10),6,8-pentaen-14-one by contact with polyphosphoric acid in a reaction-inert solvent at a temperature that is in the range from about 50° C. to about 100° C. for a period of from about ten minutes to about three hours.

10. A process as described in claim 9 wherein:
(a) 13β-methyl-3-methoxy-8,14 - secogona - 1,3,5(10),9-tetraen-14,17-dione is refluxed with palladized charcoal in toluene for about eight hours to form 13β-methyl - 3 - methoxy - 8,14 - secogona - 1,3,5(10),6,8-pentaen-14,17-dione; and then
(b) cyclizing said 13β-methyl-3-methoxy-8,14-secogona-1,3,5(10),6,8-pentaen-14,17-dione by heating said compound and polyphosphoric acid to about 70° C. in benzene for about fifteen minutes to form 13β-methyl-3-methoxygona-1,3,5(10),6,8,14 - hexaen - 17-one.

No references cited.

HENRY A. FRENCH, Primary Examiner

U.S. Cl. X.R.

260—397, 476, 479, 488, 590, 999